United States Patent [19]

Muschiatti

[11] Patent Number: 5,229,432
[45] Date of Patent: Jul. 20, 1993

[54] HIGH MELT STRENGTH PET POLYMERS FOR FOAM APPLICATIONS AND METHODS RELATING THERETO

[75] Inventor: Lawrence C. Muschiatti, Wilmington, Del.

[73] Assignee: E. I. Du Pont de Nemours and Company, Wilmington, Del.

[21] Appl. No.: 980,842

[22] Filed: Nov. 24, 1992

[51] Int. Cl.$^5$ ............................ C08J 9/34; C08J 9/08
[52] U.S. Cl. .................................. 521/182; 521/51; 521/79; 521/97
[58] Field of Search ............... 561/182, 79, 97, 51

[56] References Cited

U.S. PATENT DOCUMENTS

| | | | |
|---|---|---|---|
| 4,145,466 | 3/1979 | Leslie et al. | 428/36.92 |
| 4,152,495 | 5/1979 | Tabor | 521/134 |
| 4,205,158 | 5/1980 | Hoeschele | 528/300 |
| 4,429,060 | 1/1984 | Ide | 521/182 |
| 4,462,947 | 7/1984 | Huggard | 521/182 |
| 4,473,665 | 9/1984 | Martini-Vvedensky et al. | 521/182 |
| 4,506,090 | 3/1985 | Brennan et al. | 521/131 |
| 4,642,319 | 2/1987 | McDaniel | 521/123 |
| 4,644,019 | 2/1987 | McDaniel | 521/173 |
| 4,853,419 | 8/1989 | Hallmark et al. | 521/172 |
| 5,000,991 | 3/1991 | Hayashi et al. | 264/41 |
| 5,110,844 | 5/1992 | Hayashi et al. | 521/182 |
| 5,128,202 | 7/1992 | Subramanian et al. | 264/45.5 |
| 5,128,383 | 7/1992 | Amano et al. | 521/182 |
| 5,134,028 | 7/1992 | Hayashi et al. | 521/182 |

Primary Examiner—Morton Foelak
Attorney, Agent, or Firm—Konrad Kaeding

[57] ABSTRACT

The present invention relates to poly(ethylene terephthalate)("PET") polymer resins having high melt strength and advantageous non-Newtonian behavior; the resins can be foamed to produce closed cell structures with advantageous densities, cell sizes, cell size distributions, mechanical properties and thermal properties. More specifically, the PET resins of the present invention are highly branched due to the inclusion of one or more branching agents, and these resins can be advantageously used with environmentally friendly blowing agents.

7 Claims, No Drawings

HIGH MELT STRENGTH PET POLYMERS FOR FOAM APPLICATIONS AND METHODS RELATING THERETO

FIELD OF THE INVENTION

The present invention relates to poly(ethylene terephthalate)("PET") polymer resins having high melt strength and advantageous non-Newtonian behavior; the resins can be foamed to produce closed cell structures with advantageous densities, cell sizes, cell size distributions, mechanical properties and thermal properties. More specifically, the PET resins of the present invention are highly branched due to the inclusion of one or more branching agents, and these resins can be advantageously used with environmentally friendly blowing agents.

BACKGROUND OF THE INVENTION

Conventional polyethylene terephthalate ("PET") resins generally have poor melt strength. Hence, molten PET tends to quickly collapse when foamed. Conventionally foamed PET can also have poor mechanical properties, due to broad differences in cells sizes, cell wall thicknesses and the like. Furthermore, conventional chlorinated fluorocarbon foaming agents are problematic, since they are deemed harmful to the environment. New foaming agents have been developed, but can be problematic for a variety of reasons.

Hence, although a large potential market exists for foamed PET, cost, environmental concerns and manufacturing complexities have hindered the production of such materials.

SUMMARY OF THE PRESENT INVENTION

The present invention is directed to foamed PET having improved melt strength, and in one embodiment, an increased rate of crystallization. The final product has excellent overall strength, stiffness and resistance to creep at elevated temperatures, and therefore, is especially useful for the production of structural foamed articles, i.e., articles to be exposed to a load and require toughness.

In one embodiment, the present invention can be described in the context of a conventional foam melt fabrication process, but with the selection of an innovative PET resin, comprising a particular type and amount of PET branching agent. The branching agents of the present invention have a functionality of greater than 2, more preferably in the range of about 3-6 and a molecular weight of from about 50-5000.

The most preferred branching agent functionality is anhydride, although carboxylic acid and alcohol functional groups would also be acceptable in certain embodiments of the present invention. The most preferred branching agent is trimellitic anhydride or derivations thereof.

Optionally, the PET resins can also comprise a crystallization promoter (sometimes also referred to as crystallization "nucleating agents"). The crystallization promoter is optional, because oftentimes crystallization is not desired or the rate of crystallization without a promoter is sufficient. However, for certain foam lines, the advantages of a high rate of crystallization may call for the use of a conventional crystallization promoter.

In other embodiments of the present invention, the foam melt fabrication process of the present invention is directed to the use of environmentally friendly blowing agents, such as hydrofluorocarbons, nitrogen, carbon dioxide, fluorocarbon, and noble (or otherwise inert) gases.

In other embodiments of the present invention, the foam melt fabrication process is directed to the production of closed cell foams with relatively low densities, small closed cells, and narrow cell size distribution.

DETAILED DESCRIPTION OF THE PREFERRED EMBODIMENT AND BEST MODE

Introduction

The present invention is directed to foamed PET articles and methods of manufacture. The PET resins of the present invention will be discussed first, and thereafter, the foaming process of the present invention will also be discussed.

PET Component

The poly(ethylene terephthalate)("PET") resins of the present invention are preferably prepared from terephthalic acid (or diesters of terephthalic acid) and ethylene glycol. The PET can be modified by also incorporating diacids other than terephthalic acid or by incorporating glycols other than ethylene glycol.

For example, isopthalic acid or naphthalene dicarboxylic acid (or their respective diesters) can be used as part of the diacid component. Also, the ethylene glycol component can also contain other diols, preferably containing from about 3 to about 8 carbon atoms. Preferably, the number of diacids and diols other than terephthalic acid and ethylene glycol (respectively) is 0-5 percent of the total number of equivalents of monomer.

The PET and modified PET compositions of the present invention are further modified with a branching agent having a functionality of greater than 2, more preferably in the range of about 3 to 6. The branching agent should be present in a concentration of about 1.5 to about 6 equivalents per 100 moles of diacid (or ester equivalent thereof).

The branching agent preferably has a molecular weight of about 50-5000, more preferably, 92-3000 and a functionality of about 3-6. In more detail, the branching agent may be a polyol having 3-6 hydroxyl groups, a polycarboxylic acid having 3 or 4 carboxyl groups or a hydroxy acid having a total of 3-6 hydroxyl and carboxyl groups.

Representative polyols that function as branching agents according to the present invention include glycerol, trimethylol propane, pentaerythritol, 1,2,6-hexanetriol, sorbital, 1,1,4,4-tetrakis(hydroxymethyl)-cyclohexane, tris(2-hydroxyethyl)isocyanurate, and dipentaerythritol. In addition to those low molecular weight polyols, higher molecular weight polyols (MW 400-3000), particularly triols derived by condensing alkylene oxides having 2-3 carbons, e.g., ethylene oxide, propylene oxide with polyol initiators, which have 3-6 carbons, e.g., glycerol, can also be used as branching agents.

Representative polycarboxylic acids that can be used as branching agents include hemimellitic or trimellitic acid, trimesic acid, pyromellitic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Although the acids may be used as such, preferably they are used in the form of their lower alkyl esters or (most preferably) as their cyclic anhydrides in those instances were cyclic anhydrides can be formed.

Representative hydroxy acids that can be used as branching agents include malic acid, citric acid, tartaric acid, 3-hydroxyglutaric acid, mucic acid, trihydroxyglutaric acid, and 4-(beta-hydroxyethyl)-phthalic acid.

Especially preferred branching agents include trimellitic anhydride, trimesic acid, oxypropylated triols (optionally capped with ethylene oxide) having molecular weight of 400–3000 and tris(2-hydroxyethyl) isocyanurate.

Preferably, an antioxidant is added to the composition in an amount of up to 2 percent by weight of the polyester. Generally, the amount of antioxidant that is added to and incorporated in the polyester is from about 0.1–1% by weight of the polyester. The antioxidants can be added with the monomers prior to the formation of the polyester polymer or, if desired, they can be added to the molten polymer after polymerization has been completed. Preferably, the antioxidant is added with the monomers before polymerization is initiated.

Properties of these polyester compositions can also be modified by incorporation of various conventional organic fillers, such as carbon black, silica gel, alumina, clays and chopped fiber glass. Improvement in light stability is possible by the addition of small amounts of pigments or the incorporation of a light stabilizer, such as ultraviolet light absorbers. Flame retardants, lubricants and extenders can also be added to the PET compositions.

Also, tougheners can be added to the PET compositions of the present invention to reduce fractures, cracking or the like. Tougheners can also enhance flexure properties and can be advantageous, depending upon the end use application. Useful toughness for the present invention include elastomers acrylates and polyolefins, particularly polyethylene.

The modified PET compositions of the present invention will typically have an intrinsic viscosity (I.V.) in the range of from about 0.65 deciliters per gram (dl/g) to about 1.4 dl/g. The most preferred I.V. range is from about 0.9 to about 1.1 dl/g.

Suitable blowing agents for the present invention include inert gasses, such as nitrogen and carbon dioxide, hydrocarbons boiling about −40° C. to about 45° C., such as propane, butane and pentane; hydrofluorocarbons and hydrochloro fluorocarbons; and gas liberating chemical blowing agents, such as sodium bicarbonate, a combination of citric acid and sodium bicarbonate, azo-dicarbonamid and various endothermic blowing agents which release $CO_2$. Mixtures of blowing agents can also be used. Blowing agents are used in amounts of about 0.1 to about 20% (by weight based upon the weight of the modified PET and blowing agent) to obtain the desired high expansion ratios. Concentrations of about 1 to 3 percent are typical.

In an alternative embodiment, it may be desirable to add 0.05% to 5% (by weight based upon PET and blowing agent) of a foam nucleating agent to the PET composition to promote foaming. Examples of typical such nucleating agents for enhancing foaming are fumed silica, silicates, mixtures of silicates, calcium carbonate, hydrogen carbonates, clay and small quantities of chemical blowing agents.

The polymers of this invention have excellent melt strength, melt viscosity, melt stability and may have (if desired) rapid hardening (and crystallization) rate.

Foam Process

Extrusion techniques common to those skilled in the art can be used to foam the PET resins of the present invention, preferably to densities less than 20 kg/m$^3$. The modified PET resin can be pre-blended or dry blended with all desired additives, prior to being fed into an extruder hopper or all ingredients including the modified PET resin can be added to the extruder hopper separately through the use of additive feeders.

In a typical foam extrusion process, the basic apparatus comprises a single extruder (preferably a length to diameter ratio of at least about 30:1), a liquid injection pump or gas cylinder with injector valves, a die to form the desired object, a cooling devise and a devise to collect the expanded, extruded product.

In such a process a two-stage screw is typically used but is not critically necessary. The modified PET resin and desired additives are preferably added to the extruder feed hopper and fed to the feed section of the screw. The modified PET resin is melted in the transition section of the screw and the blowing agent added either in the transition section of the screw or near the beginning of the metering section.

The modified resin melt containing dissolved and/or dispersed blowing agent is metered by the screw to the die. Upon exiting the die the nucleated modified PET melt is expanded, optionally shaped, cooled and collected. The temperature profile on the extruder and die is adjusted to melt the modified PET in the extruder prior to the injection of the blowing agent and adequately cool the melt/blowing agent composition to allow for expansion without coalescence.

Another typical foam extrusion process employs two tandem extruders. In this process the modified PET is mixed, melted and the blowing agent injected in the first extruder. The melt/blowing agent composition is transferred by means of a conventional transfer tube to the feed section of the second extruder which is used to transfer the melt blend to the die and to bring the melt temperature and pressure in the die to the values necessary for optimum foam formation. Typically the two extruders are of different sizes. The tandem extruder process allows for excellent control of process variables.

As is apparent to those of ordinary skill in the art, various screw configurations and designs typical for this application can be used to prepare foamed or expanded, modified PET. Mixers can be added to the screw or as independent components to disperse additives, nucleants and blowing agents. Twin screw extruders can be used.

What is claimed is:
1. A foam composition comprising:
  100 weight parts branched polyethylene terephthalate having an intrinsic viscosity of about 0.65 to about 1.4 deciliters per gram, whereby said branched polyethylene terephthalate is derived from a diacid (or ester forming equivalent) and comprises about 1.5 to about 6.0 equivalents of a branching agent per 100 moles of diacid (or ester forming equivalent), said branching agent having a functionality of greater than 2 and a molecular weight of from about 50 to about 5000, and whereby greater than about 90% of the cells of said foam composition are closed and the density of the foam composition is less than about 0.1 gram per cubic centimeter.

2. The composition of claim 1 wherein the density is less than about 0.05 grams per cubic centimeter.

3. The composition of claim 2 wherein the density is less than about 0.025 grams per cubic centimeter.

4. The composition of claim 1 wherein the cell size distribution is substantially uniform.

5. The composition of claim 1 further comprising a crystallization nucleating agent.

6. The composition of claim 1 further comprising 2.5–6.0 equivalents of branching agent per 100 moles of terephthalic acid.

7. The composition of claim 3 wherein the branching agent is trimellitic anhydride.

* * * * *